(12) United States Patent
Hirs

(10) Patent No.: US 6,186,340 B1
(45) Date of Patent: Feb. 13, 2001

(54) CYLINDRICAL DRUM FILTER HAVING TWO PARALLEL CIRCULAR CIRCUMFERENTIALLY SPACED SUPPORT RODS

(76) Inventor: Gene Hirs, 3822 W. Thirteen Mile Rd. Apt. D, Royal Oak, MI (US) 48073

(*) Notice: Under 35 U.S.C. 154(b), the term of this patent shall be extended for 0 days.

(21) Appl. No.: 09/172,340

(22) Filed: Oct. 14, 1998

(51) Int. Cl.$^7$ .................................................. B01D 33/50
(52) U.S. Cl. ........................ 210/411; 210/393; 210/394
(58) Field of Search ................... 210/411, 402, 210/403, 394, 393, 497.01, 232, 499

(56) References Cited

U.S. PATENT DOCUMENTS

| | | | | |
|---|---|---|---|---|
| 2,567,266 | * | 9/1951 | Young | 210/199 |
| 2,765,915 | * | 10/1956 | Nilsson | 210/703 |
| 3,979,289 | * | 9/1976 | Bykowski et al. | 210/784 |
| 4,655,937 | * | 4/1987 | Hendrix | 210/772 |
| 4,869,823 | * | 9/1989 | Otani et al. | 210/349 |
| 5,139,670 | * | 8/1992 | Hirs | 210/394 |
| 5,182,008 | * | 1/1993 | Shelstad | 210/139 |
| 5,549,825 | * | 8/1996 | Barzuza | 210/411 |
| 5,968,357 | * | 10/1999 | Doelle et al. | 210/485 |

* cited by examiner

Primary Examiner—W. L. Walker
Assistant Examiner—Marianne Ocampo
(74) Attorney, Agent, or Firm—Lyon P.C.

(57) ABSTRACT

A drum filter comprises a pair of circular disks connected in coaxial relation by a plurality of axially extending disc support rods. A cylindrical filter media is disposed between the disc support rods. Unfiltered liquid is admitted to the interior of the drum filter and flows radially outwardly therefrom through the filter media. Reciprocating backwash nozzles direct high pressure liquid radially inwardly against the exterior surface of the filter media to backwash contaminants collected on the radially inner surface thereof into a contaminant collector disposed internally of the filter drum. The filter media is sealably connected to the circular disks by a novel retention system.

2 Claims, 3 Drawing Sheets

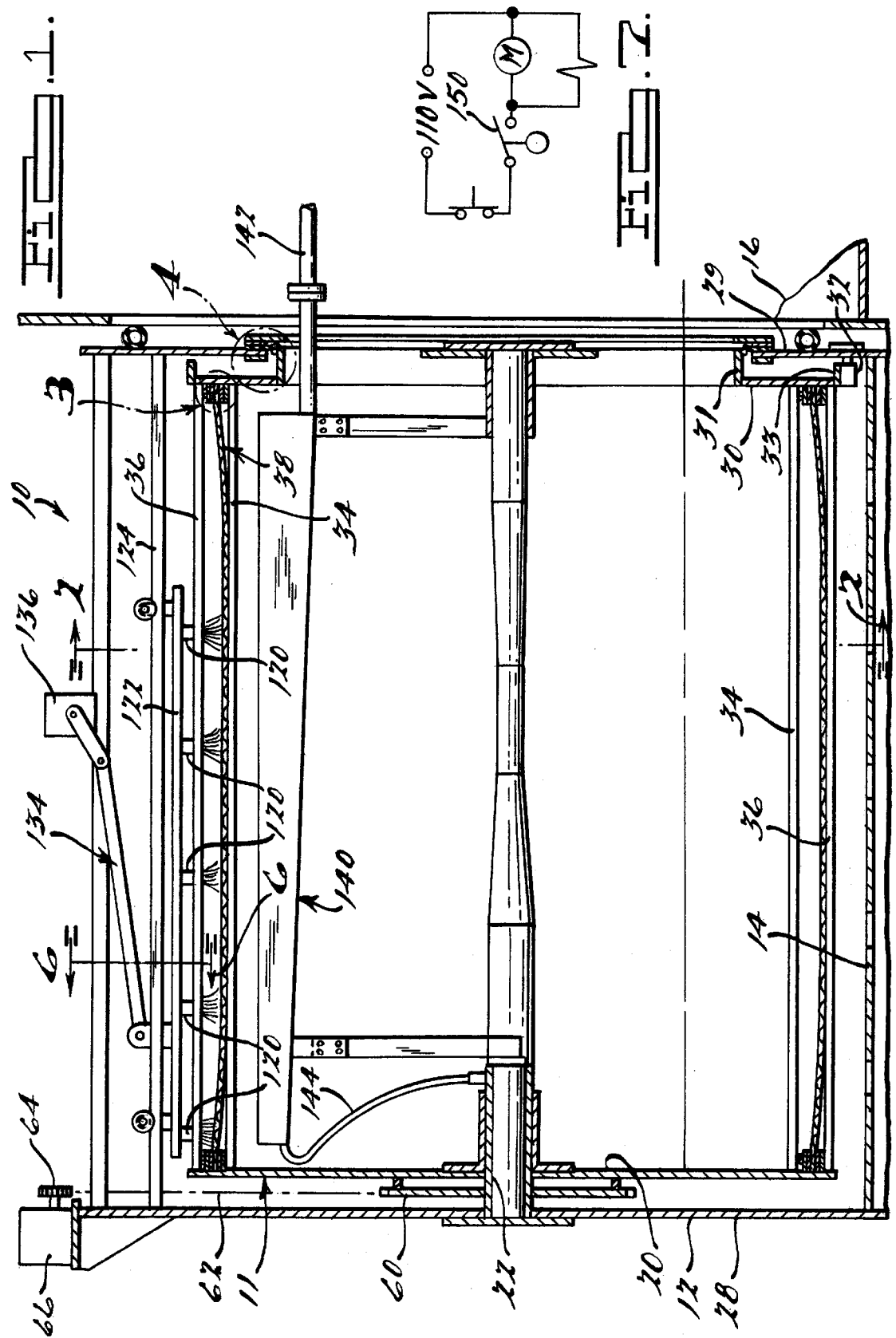

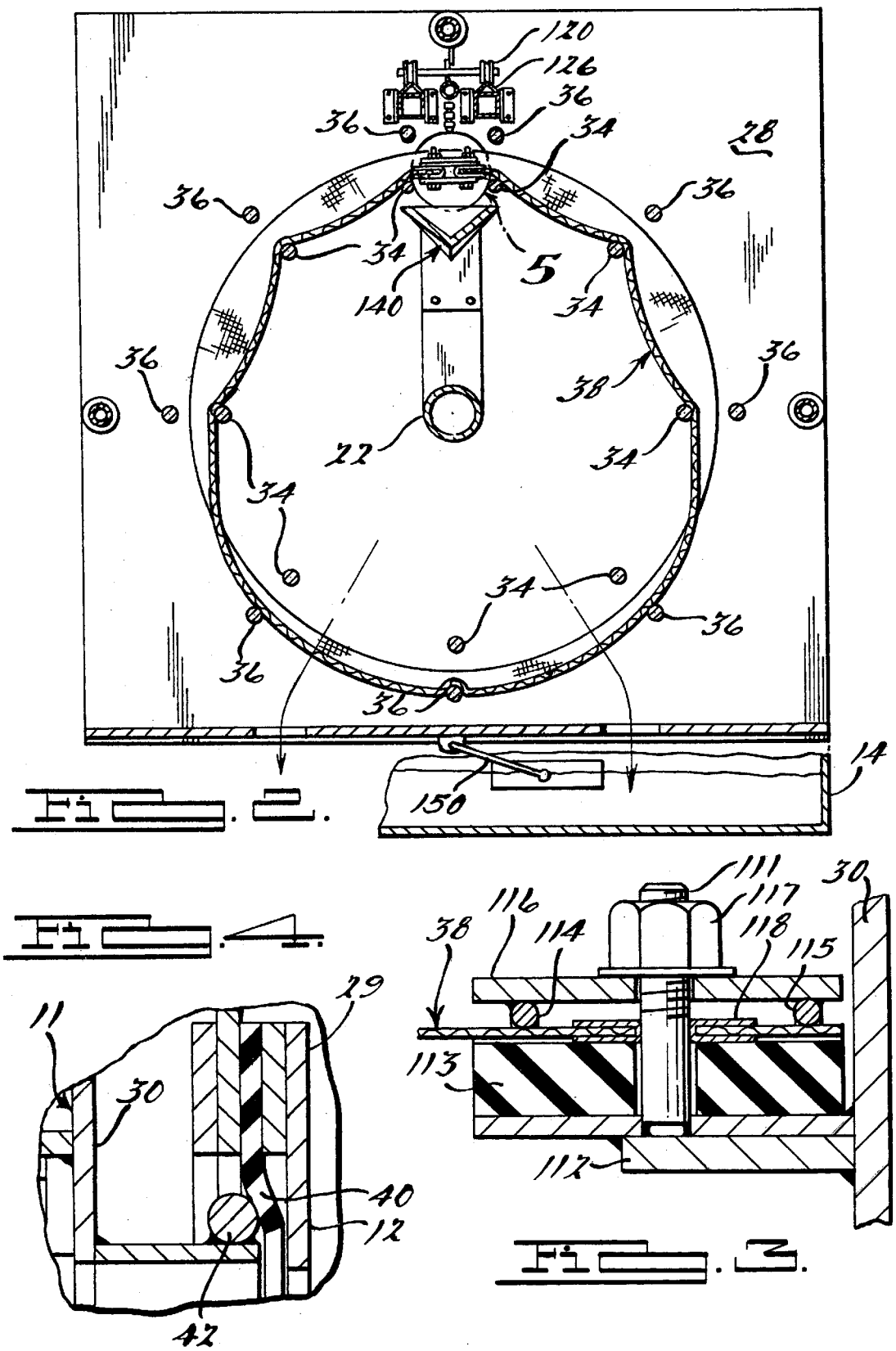

CYLINDRICAL DRUM FILTER HAVING TWO PARALLEL CIRCULAR CIRCUMFERENTIALLY SPACED SUPPORT RODS

BACKGROUND OF THE INVENTION

Certain applications of a liquid filter permit the use of a permanent filter media. However, permanent filter medias require periodic cleaning, as by backwashing, as taught in my U.S. Pat. No. 5,139,670. Where capacity of the filter is relatively large, backwash efficiency must be maximized. Moreover, because an increase in capacity is normally achieved by increasing the area of the filter media, it is extremely important to minimize unit stress on the filter media. When a permanent filter is utilized on a drum filter, assembly of the filter media onto the drum also presents a problem.

SUMMARY OF THE INVENTION

The aforesaid problems are solved, in accordance with a preferred constructed embodiment of the present invention, by a radial outflow drum type filter wherein a flexible permanent filter media is supported by a plurality of bars arranged in a circular array. Backwash is accomplished by a plurality of pencil jets that are directed radially inwardly and downwardly toward the external surface of the filter media to effect backwash of sediment into an internally disposed sediment collector. Edges of the filter media are retained on the drum by a novel sealing system. The sealing system also facilitates assembly of the filter media onto the drum. Rotation of the drum and actuation of the media cleaning jets is controlled by a float switch disposed externally of the filter drum.

More specifically, the rotatable drum filter of the present invention comprises a pair of spaced disks that are connected by a plurality of axially extending bars. The bars are orientated in a circumferentially spaced array radially outwardly of a cylindrical, flexible permanent filter media, for example, a finely woven mono filament polypropylene or dacron cloth belt. If desired, for structural integrity, and additional support of the filter media, a second plurality of circumferentially spaced rods can be employed between the filter discs and spaced radially inwardly of the filter media. In either embodiment the cloth filter media spans the distance between the spaced disks so as to form a fluid permeable cylinder. The edges of the filter media are retained and sealed to the discs by a plurality of circumferentially spaced pins and annular clamping and sealing rings. Contaminated liquid flows into the interior of the filter media cylinder through one of the discs thence radially outwardly through the filter media. The filter discs and the media cylinder rotate intermittently under the control of an external float switch disposed in a clean tank underlying the filter cylinder. Sediment or "cake" is intermittently backwashed from the filter media into an internally disposed collector by pressurized liquid flowing from a series of reciprocating jet type nozzles disposed exteriorly of the filter media cylinder at the top thereof. Thus, backwashing is in the reverse direction from filtration. Flexure of the cloth filter media, which enhances cracking of the sludge cake and backwashing efficiency, is accommodated by the circumferential spacing of the media support bars.

BRIEF DESCRIPTION OF THE DRAWINGS

FIG. 1 is an elevational view, partially in section, of a preferred constructed embodiment of the drum filter of the present invention FIG. 2 is a view taken along the line 2—2 of FIG. 1.

FIG. 3 is an enlarged view taken within the circle 3 of FIG. 1.

FIG. 4 is an enlarged view taken within the circle 4 of FIG. 1.

FIG. 7 is a control circuit for the drum rotation motor and backwash valve of the drum filter.

DETAILED DESCRIPTION OF THE PREFERRED EMBODIMENT(S)

Figure 5:
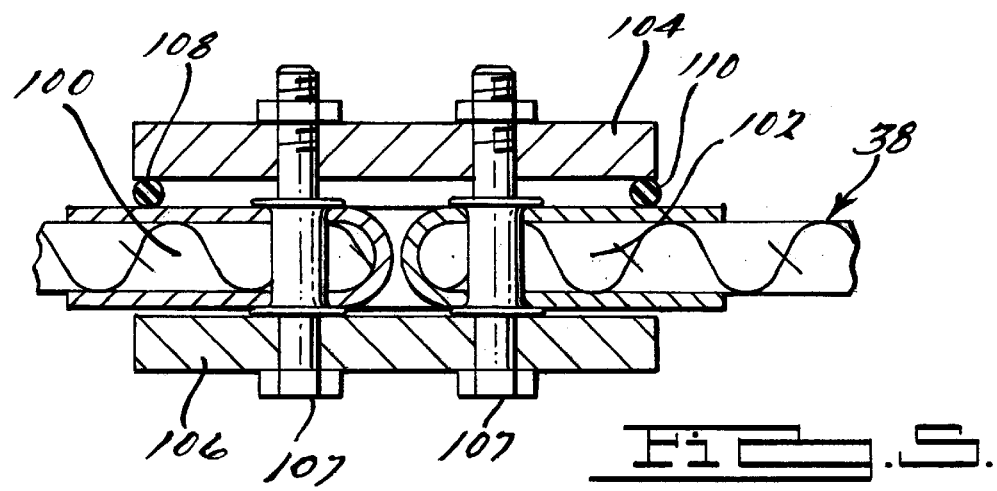
FIG. 5 is a view taken within the circle 5 of FIG. 2.

As seen in FIG. 1 of the drawing, a drum filter 10, in accordance with a preferred constructed embodiment of the instant invention, comprises a drum 11 that is disposed internally of a tank 12. The tank 12 is disposed in liquid flow relationship between a clean liquid tank 14 and a contaminated liquid tank 16. Contaminated liquid flows horizontally from the contaminated liquid tank 16, to the interior of the drum 11, thence radially downwardly therefrom to the clean tank 14 by gravity flow.

The drum 11 of the filter 10 comprises an imperforate disk 20 that is journaled for rotation on a fixed shaft 22 that is supported by a wall 28 of the filter tank 12. A disk 30 having a central aperture 31 therein is coaxially aligned with and axially spaced from the disk 20 so as to form the opposite end of the drum 11. The disc 30 is rotatably supported by rollers 32 on an opposite wall 29 of the tank 12 that engage a rim 33 on the disk 30.

The disks 20 and 30 are connected by a first plurality of circumferentially spaced axially extending connecting bars 34, as well as by a second plurality of circumferentially spaced axially extending connecting bars 36. The bars 34 are disposed radially inwardly of the bars 36. The bars 34 and 36 provide for controlled deflection of a permanent filter media 38, as will be discussed in greater detail.

As best seen in FIG. 4, a flexible annular seal 40 on the end wall 29 of the tank 12 engages a complimentary circumferentially extending seat 42 on an axial flange 37 of the drum disk 30 thereby to ensure that unfiltered fluid flowing from the tank 16 to the interior of the drum 11 cannot flow directly into the clean tank 14.

The drum 11 of the filter 10 is provided with a sprocket 60 which is driven, through a chain 62, by a drive sprocket 64 on a speed reducer 66. The speed reducer 66 is driven by an electric motor (not shown).

As best seen in FIG. 5, the juxtaposed ends 100 and 102 of the media belt 38 are clamped between axially extending bars 104 and 106 that are biased toward one another by bolts 107. The ends 100 and 102 of the belt 38 are sealed between between beads 108 and 110 and the bar 106. Opposite ends of the radially inner bar 106 are secured to the discs 20 and 30. The radially outer bar 104 is removable to facilitate assembly of the ends 100 and 102 of the filter media 38 to the bolts 107 on the bar 106. More than one set of bars 104 and 106 can be provided, if desired, to facilitate media replacement.

In accordance with another feature of the invention, and as best seen in FIG. 3, both circumferential edges of the filter media 38 are provided with grommets 118 that are disposed over pins 111 that extend radially outwardly from flanges on the discs 20 and 30, one of which is shown in FIG. 3 and designated by the numeral 112. An annular elastomeric seating element 113 on each of the flanges 112 cooperates with annular sealing-beads 114 and 115 on an arcuate clamp bar 116 to seal the edges of the filter media 38. Advancement of a nut 117 on the pin 111 compresses the sealing beads 114 and 115 against the filter media 38 which, in turn, is compressed against the elastomeric seating element 113.

Figure 6:
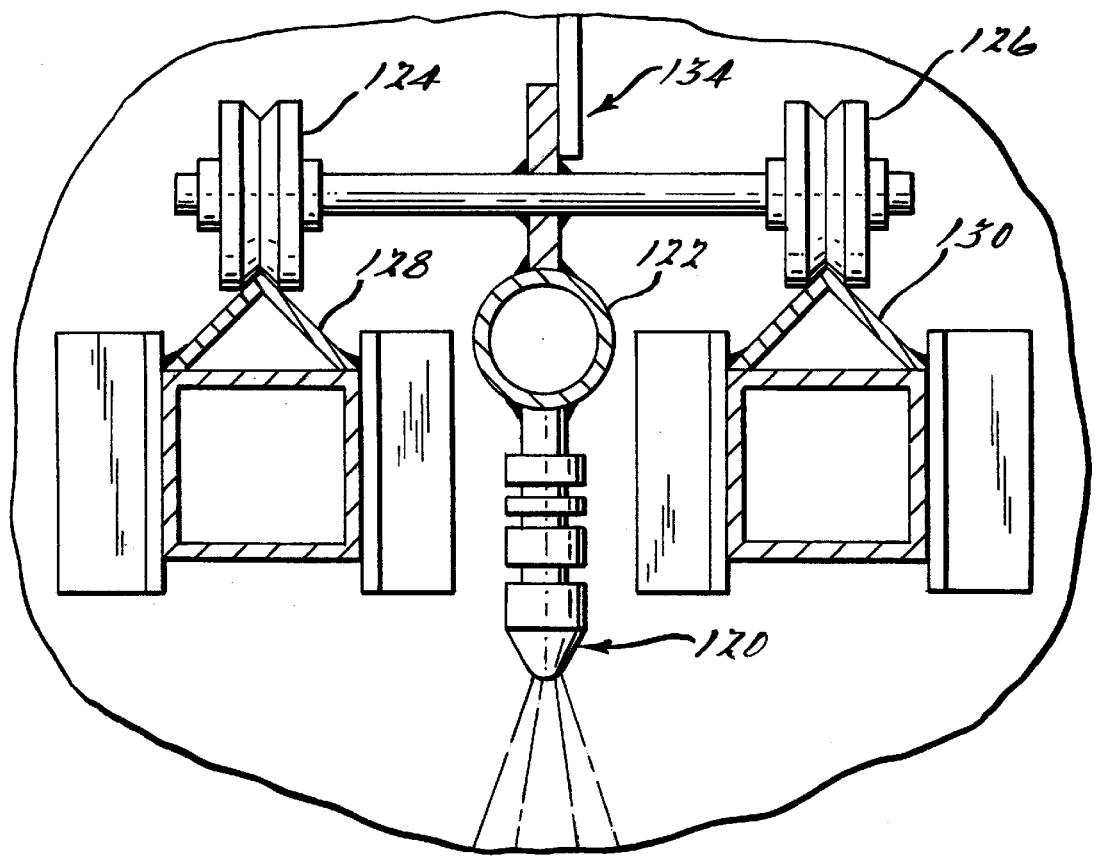
FIG. 6 is a view taken along the line 6—6 of FIG. 1.

As seen in FIGS. 1, 2 and 6 of the drawings, backwash of the filter media 38 is achieved by pressurized liquid flowing from a plurality of nozzles 120 disposed exteriorly of the filter media 38 at the upper extremity thereof. The nozzles 120 are supplied with pressurized clean liquid from any suitable external source, for example, the clean tank 14. The nozzles 120 are fed from a manifold 122 which is carried by rollers 124 and 126 that ride on inverted V-shaped ways 128 and 130, respectively. The manifold 122 and nozzles 120 are reciprocated by a crank mechanism 134 which is driven by a gearmotor 136. The backwash liquid is directed downwardly against the filter media 38 in a manner that forces the filter media 38 to bow downwardly or radially inwardly, as seen in FIGS. 1 and 2 of the drawings, against the radially inner support bars 34 whereby the filter media 38 flexes to crack any sediment or "cake" thereon but is supported against excessive unit stress by the bars 34.

Contaminants blown off the radially inner surface of the filter media 38 flow from a contaminant collector 140 to an outlet pipe 142 that extends through the center of the rotatable disk 30 of the filter drum 11, thence to a sludge settling tank (not shown). Flow of contaminants from the interior of the drum 11 is augmented by pressurized liquid that is injected into the collector 140 from a conduit 144.

As seen in FIG. 2, and in accordance with another feature of the invention, a float switch 150 is disposed externally of the filter drum 11 in the clean tank 14. The switch 15 is closed when sediment builds up on the filter media 38, and the level of clean fluid in the tank 14 goes down. Closing of the switch 150 energizes the motors 66 and 136 to initiate backwash. Accordingly, the drum 11 is stationary the majority of the time allowing a cake build up on the filter media 38 which enhances the quality of filtration. For example, a 100 Micron mesh filter media 38 captures relatively large particles and a cake is formed which effects fine filtration. The average equivalent mesh is, for example, 30 microns. Another advantage is that it is easier and more efficient to backwash a 100 Micron filter media than a 30 micron filter media. Additional advantages are that there is less wear and tear on the filter media 38 and less clean backwash water is required when rotation of the filter drum 11 of the present invention is intermittent in operation.

It is also to be noted that when the filter media 38 is biased to either the radially outwardly convex condition incident to the filtration phase of operation due to liquid flow from the inside of the filter drum 11 radially outwardly into the tank 14, such flexure is supported by the radially outer support bars 36. Conversely, during backwash, the filter media 38 is biased radially inwardly against the radially inner bars 34 due to impact of liquid from the nozzles 120 on the exterior of the filter media 38. Thus, the filter media 38 is supported at all times in a manner that insures the structural integrity thereof. Further reversal of the direction of flexure of the filter media 38 incident to backwash augments cracking of the "cake" on the inner surface thereof to facilitate backwash.

While the preferred embodiment of the invention has been disclosed, it should be appreciated that the invention is susceptible of modification without departing form the scope of the following claims.

I claim:

1. A fluid filter comprising:

a pair of circular disks disposed in spaced coaxial relation;

a plurality of rods extending between said disks parallel to the central axis thereof and disposed in two parallel circular circumferentially spaced array, wherein one of said circular arrays has a diameter greater than the other of said arrays;

a permanent cylindrical filter media having a radially inner surface and an exterior surface, and being disposed between said two circular circumferentially spaced arrays;

means adjacent a periphery of each of said disks for sealing edges of said filter media thereto;

an aperture in one of said disks for admitting unfiltered liquid to the interior of the cylindrical filter media;

a backwash nozzle disposed radially outwardly from said rods and said filter media for directing a flow of high pressure liquid radially inwardly against the exterior surface of said filter media whereby sediment collected on the radially inner surface of said cylinder filter media is removed therefrom, and;

a contaminant collector disposed internally of said cylindrical filter media for conducting sediment to the exterior thereof.

2. A fluid filter comprising:

a pair of circular disks disposed in spaced coaxial relation;

a first plurality of rods support extending between said disks parallel to the central axis thereof and disposed in a circular first circumferentially spaced array;

a second plurality of support rods extending between said disks parallel to the central axis thereof and disposed in a second circular circumferentially spaced array having a diameter greater than the array first circular of said first rods;

a flexible filter media disposed between said arrays of support rods so as to define a filter media cylinder and having circular longitudinally spaced edges and a radially inner surface;

a pair of annular seals on said disks, respectively, for sealing the circular longitudinally spaced edges of said filter media with respect thereof;

an aperture in one of said disks for admitting unfiltered liquid to the interior of the media cylinder;

a backwash nozzle disposed exteriorly of the filter media cylinder for directing a flow of high pressure liquid radially inwardly against the exterior surface of said filter media cylinder whereby sediment collected on the radially inner surface of said filter media cylinder is removed therefrom; and, a contaminant collector disposed internally of said filter media cylinder for conducting sediment to the exterior of said filter media cylinder.

\* \* \* \* \*